(12) United States Patent
Sinha et al.

(10) Patent No.: US 6,281,595 B1
(45) Date of Patent: Aug. 28, 2001

(54) MICROTURBINE BASED POWER GENERATION SYSTEM AND METHOD

(75) Inventors: Gautam Sinha, Clifton Park, NY (US); Michael John Ryan, Tarzana, CA (US); Luis Jose Garces, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/617,955

(22) Filed: Sep. 25, 2000

(51) Int. Cl.[7] ............... F02N 11/06; H02P 9/04
(52) U.S. Cl. .......... 290/40 A; 290/40 B; 290/40 C; 290/40 F; 290/40 R; 290/51; 290/52
(58) Field of Search ............... 290/40 A–40 F, 290/51, 52

(56) References Cited

U.S. PATENT DOCUMENTS

| | | | |
|---|---|---|---|
| 4,219,739 | * 8/1980 | Greenwell | 290/46 |
| 4,786,852 | * 11/1988 | Cook | 322/10 |
| 4,935,684 | 6/1990 | Watanabe | 318/729 |
| 5,003,252 | 3/1991 | Nystrom | 324/158 |
| 5,546,742 | * 8/1996 | Shekhawat et al. | 60/39.142 |
| 5,581,168 | * 12/1996 | Rozman et al. | 318/723 |
| 5,710,699 | 1/1998 | King et al. | 363/132 |
| 5,903,116 | 5/1999 | Geis et al. | 318/140 |
| 5,930,124 | 7/1999 | Otake | 318/801 |
| 6,020,713 | 2/2000 | Geis et al. | 318/801 |
| 6,023,135 | 2/2000 | Gilbreth et al. | 318/140 |
| 6,031,294 | 2/2000 | Geis et al. | 290/52 |
| 6,064,122 | 5/2000 | McConnell | 291/32 |
| 6,093,975 | * 7/2000 | Peticolas | 290/52 |
| 6,147,414 | * 11/2000 | McConnell et al. | 290/52 |

FOREIGN PATENT DOCUMENTS

| | | | |
|---|---|---|---|
| 9932762 | 7/1999 | (WO) | 290/38 R |
| 0039917 | 7/2000 | (WO) | 290/38 R |

OTHER PUBLICATIONS

U.S. application No. 09/617,954, G. Sinha, filed Sep. 25, 2000, Entitled "A Starting System and Method For a Microturbine Power Generation Unit", Attorney Docket No. RD–28,038.

* cited by examiner

Primary Examiner—Elvin Enad

(57) ABSTRACT

A power electrical system is disclosed to connect a microturbine and an electrical machine to electrical power sources and a load. The invention permits the microturbine to be started using an external DC power source and/or an external AC power source. DC power is converted to AC power by means of a buck-boost chopper, DC bus and a DC-to-AC converter. AC power, from the AC power source, is converted to frequencies and voltages suitable to start a microturbine by a pair of DC-to-AC converters and the DC bus. The frequency and voltage levels of the AC power are gradually increased to accelerate the microturbine to startup speed. Once the microturbine is started, the external power sources are disconnected, and the DC bus and the DC-to-AC converters produce output AC power at a voltage level and frequency to match an electrical load.

9 Claims, 3 Drawing Sheets

MICROTURBINE BASED POWER GENERATION SYSTEM AND METHOD

BACKGROUND of INVENTION

The invention relates to the field of turbines and, in particular, to the application of microturbines for electrical power generation.

Microturbines are small gas turbines typically used for on-site power generation. They are generally applied as back-up or auxiliary power sources for office buildings, retail stores, small manufacturing plants, homes and many other commercial facilities. These facilities have traditionally been powered by electric utilities via a grid of power distribution lines. Using microturbines, these facilities generate electrical power at their own sites, and avoid being solely dependent on conventional electrical power grids and utilities. Microturbines may also generate power at less cost and/or more reliably than the electrical power provided over the grid by electrical power utilities.

Microturbines are not self-starting devices. They require a starter and a power source for the starter. The starter usually includes a powerful electric motor and a battery which acts as the power source for the starter. If the battery loses its charge or otherwise fails, the microturbine cannot be started. Batteries fail due to a variety of causes, including being discharged if used too often to start the microturbine without being charged, if left uncharged and unused for an extended period of time (such as when the microturbine is not used for many months), or if a cell in the battery shorts out or otherwise fails. Accordingly, there is a need for an alternative power source to start a microturbine.

To safeguard against battery failure it has been proposed that the starter for a microturbine have an alternative source of power. Such an alternative power source may be the power grid provided by electrical utilities, as is disclosed in U.S. Pat. No. 6,031,294 ('294 Patent). However, the power circuitry that is disclosed in the '294 Patent for directing power from a grid includes an additional rectifier and contactor which are used exclusively to couple a power grid to start a microturbine. This additional circuitry needed to start the microturbine is expensive and complex. There is a need for power circuitry that may apply AC (alternating current) power and/or DC (direct current) power from a battery, power grid or other power source to start a microturbine that is not exclusively dedicated to starting, is not excessively expensive and is not complex.

SUMMARY of INVENTION

The present invention relates to power circuits that start a microturbine and couple a microturbine to an electrical load. The inventive power circuits direct starting power from a DC battery, an AC power utility grid, and/or another source of electrical power. An advantage of the invention is the use of minimal circuit components for a power circuit which couples a microturbine to a load and to AC and DC starting power sources. Another advantage provided by the invention is to provide a backup starting power source that is available in the event of battery failure.

The power circuit used in accordance with one embodiment of the present invention includes a pair of active DC-to-AC converters, in contrast to a conventional single active DC-to-AC converter and a passive rectifier. These DC-to-AC converters operate alternatively to convert DC-to-AC power as they are intended to function, and as a rectifier to convert AC power back to DC power. Using a DC-to-AC converter as an AC-to-DC rectifier and adding a second active DC-to-AC converter yields a less-expensive and less-complex power circuit for coupling a microturbine to multiple sources of starting power and to a load. By adding a second active DC-to-AC converter, the present invention provides a single power circuit that serves the purposes of connecting AC and/or DC starting power sources to a microturbine, and connecting the microturbine to an electrical load. This dual-purpose power circuit is less complex and can be less expensive than prior circuits that have components dedicated to supply starting power and other components dedicated to applying microturbine generated power to a load.

BRIEF DESCRIPTION of DRAWINGS

Other advantages and novel features of the present invention will become apparent upon review of the following description in conjunction with the accompanying drawings.

DETAILED DESCRIPTION

Figure 1:
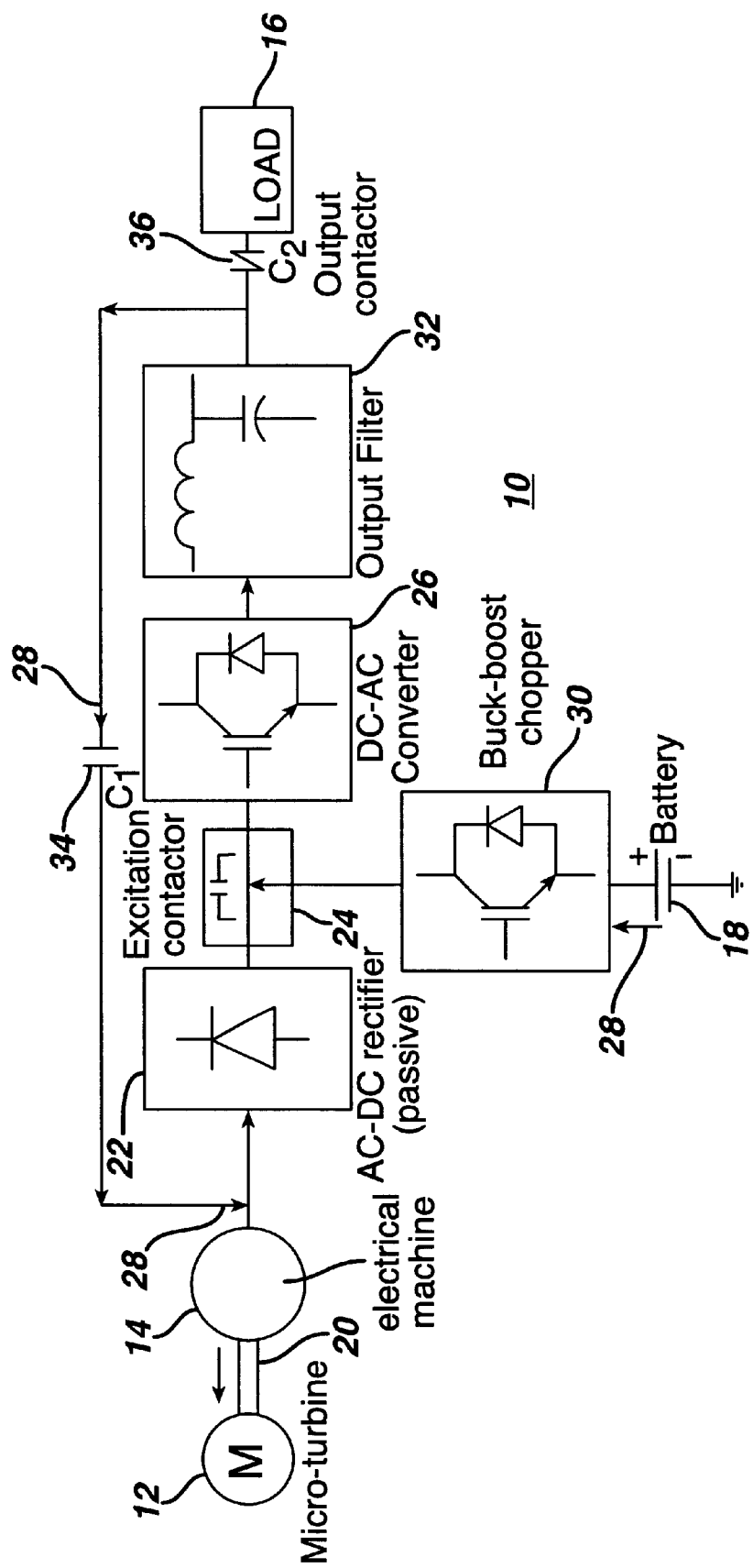
FIG. 1 is an electrical schematic diagram showing a conventional power circuit topology of a microturbine.

FIG. 1 is an electrical schematic diagram of a conventional power circuit 10 for coupling a microturbine 12 and an electrical machine 14 to an electrical load 16 and to a starting battery 18. The electrical machine 14 may be configured to operate as a motor to drive the microturbine during a startup mode, and as a generator that is driven by the microturbine to produce electrical power during a power production mode. The microturbine and electrical machine may share a common rotating output shaft 20 and be formed as an integral unit. Alternatively, the microturbine and electrical machine may be separate units each having a rotating shaft output/input that is coupled to the other.

A conventional microturbine generally includes a compressor (if natural gas is the fuel used), a recuperator, a combustion chamber, and a turbine (not shown). Air from the compressor is mixed with fuel in the combustion chamber to generate hot, high pressure gases that drive the turbine. The turbine exhaust gases are ducted through the recuperator to transfer heat to the inlet air and thereby increase the energy of the air-fuel mixture in the combustion chamber.

Once started, the microturbine operates on its own and produces output power that is applied to the output power shaft 20. This shaft drives a rotor (not shown) of the electrical machine 14. The electrical machine may comprise a polyphase, e.g., three-phase unit that includes output/input connections to each of its phases or windings. The rotor of the electrical machine generally includes a plurality of alternating magnetic poles arranged symmetrically around the axis of the electrical machine. During power generation operation of the microturbine, the magnetic fields emanating from the rotor pass through a stator (not shown) of the electrical machine that surrounds the rotor. The stator has a cylindrical aperture sized to receive the rotor. The stator generally includes a plurality of windings and magnetic poles of alternating polarity. When the electrical machine is functioning as a generator, the magnetic fields rotating through the stator produce current in the stator windings.

The current produced by the electrical machine is proportional in frequency to the rotational speed of the rotor and the gas turbine. The electrical power output from the electrical machine is applied to the load 16 by the power circuit 10.

The frequency of the AC power produced by electrical machine 14 may not match the power and frequency requirements of load 16. The load 16 may comprise a polyphased AC electrical power system. The power circuit 10 converts the AC power from the electrical machine to AC power that matches the electrical load 16. For this conversion, the power circuit 10 converts the AC power from the electrical machine 14 to DC power using a passive AC-to-DC rectifier 22. The DC power from rectifier 22 is applied to charge a capacitive DC bus 24. The bus provides DC power for an active DC-to-AC converter 26. The AC power from the DC-to-AC converter 26 is produced at a voltage level and frequency that suits the electrical demands of the load 16. The load may comprise an electrical system for a residence, retail store, other commercial establishment or other site requiring electrical power.

To produce power, the microturbine must first be started by driving the electrical machine 14 as a motor which, in turn, accelerates the microturbine to a startup speed. Once the turbine reaches the start-up speed, the combustion produces sufficient power to sustain the rotation of the microturbine without external power. Until the turbine is accelerated to start-up speed, external power is required to rotate the turbine. During start-up, electrical power flows in direction of the arrows 28 to operate the electrical machine 14 as a motor. Power flows in an opposite direction after the microturbine has been started and the electrical machine is producing power.

To start the microturbine, the battery 18 provides a source of direct current (DC) at a constant voltage to the power circuit 10. The battery may comprise a conventional storage cell battery having deep discharge capability, for example. The DC power (at substantially constant voltage) from the battery is converted to a DC power (at substantially constant voltage that is not necessarily the same as the battery voltage) by a buck-boost chopper 30 connected to the battery. The buck-boost chopper produces a constant DC voltage that is stepped-up or stepped-down from the battery voltage level to match the voltage level of the bus 24. During start-up, the DC power from the buckboost chopper 30 is applied to charge the DC bus 24. Once the turbine has been started and is generating power, the buck-boost chopper 30 converts DC power from the DC bus 24 to a DC voltage level suitable to charge the battery 18.

An example of a useful buck-boost chopper is disclosed in co-pending and commonly assigned, Sinha, entitled A Starting System And Method For A Microturbine Power Generation Unit U.S. Application Ser. No. 09/617,954, filed Sep. 25, 2000 which discloses a microturbine starting system in which the buck-boost chopper that produces a variable DC voltage for charging a DC bus in a starting circuit for a microturbine.

The DC bus 24 may comprise a conventional capacitive device commonly used for distributing DC power within a power circuit. The capacitive DC bus 24 distributes DC power to an active DC-to-AC (alternating current) converter 26. The active DC-to-AC converter 26, e.g., a PWM inverter, converts the DC power from the bus to AC power. The AC power is delivered at gradually increasing voltage levels and frequencies that are needed to start the microturbine or to a constant voltage and frequency to match the load, depending on the mode of operation of the power circuit. The AC power from the DC-to-AC converter 26 is filtered to eliminate unwanted noise or other frequency components of the AC power by an inductive/capacitive filter 32.

Figure 2:
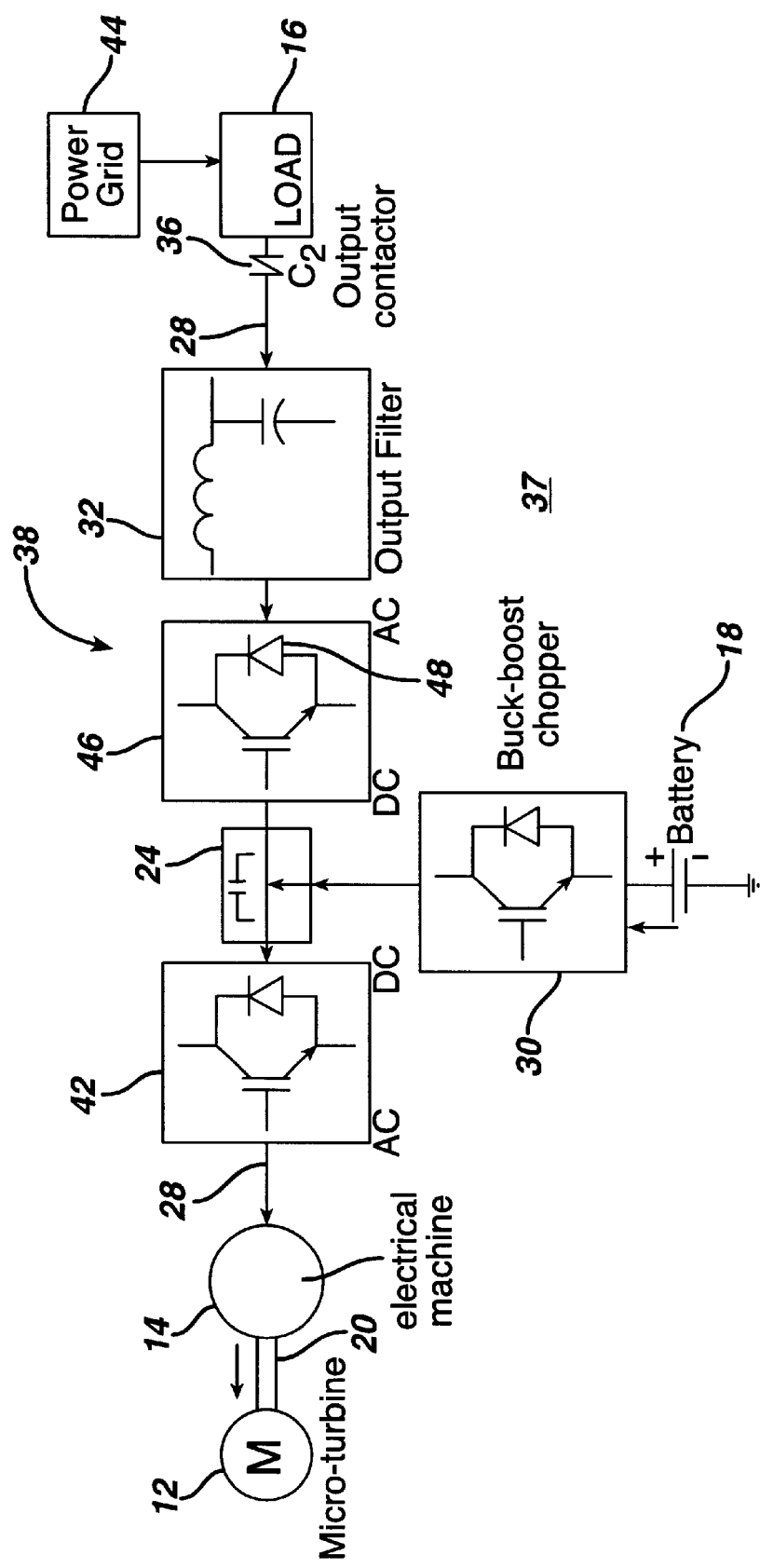
FIG. 2 is an electrical schematic diagram showing a novel power circuit topology of a microturbine configured for a start-up mode.
Figure 3:
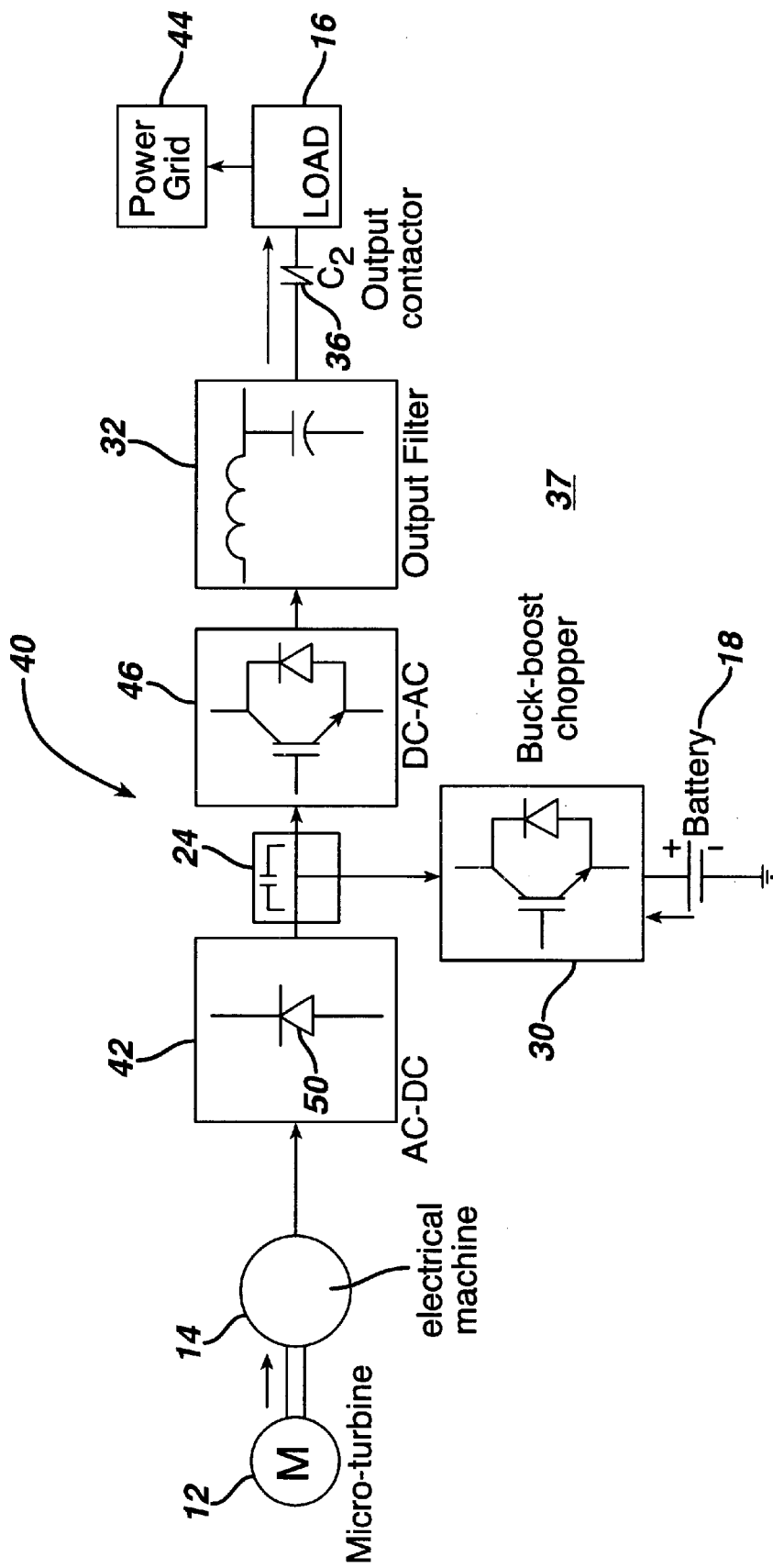
FIG. 3 is an electrical schematic diagram showing the power circuit of FIG. 2 configured for a power generation mode.

During startup, the AC power from the DC-to-AC converter 26 is applied via excitation capacitive contactor 34 (C1) to the stator windings of the electrical machine 14, which in turn drives the electrical machine as a motor to start the microturbine 12. Also during startup, the power circuit 10 is isolated from the load by opening output contactor 36 (C2). Once the microturbine is producing power, the power circuit is connected to the load by closing output contactor C2 and opening capacitive contactor FIGS. 2 and 3 show a novel power circuit 37 having two circuit topologies 38, 40. Both topologies may be implemented with the same electrical circuit 37 and components. The startup topology 38 of FIG. 2 shows the circuit 37 configured to provide startup AC power to the electrical machine 14, which is being operated as a motor to start the microturbine 12. The power generation circuit topology 40 of FIG. 3 shows the circuit 37 configured to convert the AC power produced by the electrical machine 14 to AC power that matches and is coupled to the load 16. In addition, the power circuit 37 shown in FIGS. 2 and 3 may be a polyphase circuit, such as a three phase circuit having AC circuits configured to handle three equal but out of phase components of the AC power.

In an exemplary embodiment of the invention, a battery 18 provides a source of DC starting power, and a power utility grid 44 provides a source of AC starting power for starting a microturbine 12. The AC starting power may be applied in conjunction with the DC starting power, or as an alternative to the DC power. The DC voltage of the battery is converted by a buck-boost chopper circuit 30 to a variable voltage or constant voltage DC power suitable for charting a capacitive DC bus 24 that distributes DC voltage to a pair of active DC-to-AC converters 42, 46.

The first DC-to-AC converter 46 is coupled to a load 16 and/or the AC power source 44. When the microturbine is producing power (topology of FIG. 3), the first DC-to-AC converter 46 transforms the DC power of the DC bus 24 to AC power for the load 16. During a microturbine startup phase (topology of FIG. 2), the first DC-to-AC converter 46 is configured as an AC-to-DC rectifier. When the converter 46 is configured as a rectifier, AC power from a public utility 44 is converted by the first converter 46 to DC power that charges the DC bus and provides starting power for the microturbine.

The second active DC-to-AC converter 42 is coupled to the electric machine 14 of a microturbine. To start the microturbine (topology of FIG. 2), the second DC-to-AC converter 42 converts the DC power from the bus 24 to AC power that drives the electric machine as a motor and accelerates the microturbine to startup speed. The second active DC-to-AC converter 42 increases both the voltage and frequency of the AC power it produces. By gradually increasing the frequency and voltage, the AC power is applied to the electrical machine to accelerate the miniroturbine to a starting speed. After the microturbine has been started (topology of FIG. 3), the second DC-to-AC converter 42 is operated as a passive AC-to-DC rectifier to convert the AC power from the electrical machine to DC power applied to charge the DC bus 24. In turn, the DC power from the bus is converted by the first active DC-to-AC converter 46 to AC power at a frequency and voltage level suitable for the load 16. Accordingly, both DC-to-AC converters are alternatively operated as an active DC-to-AC converter and as a passive AC-to-DC rectifier.

As shown in FIG. 2, the second active DC-to-AC converter 42 is connected to the stator windings to drive the electrical machine 14 as a motor and start the microturbine. The converter 42 servers dual purposes of (1) converting DC power from the DC bus 24 to AC power applied to the electrical machine (FIG. 2), and (2) converting the AC power generated by the microturbine (once started) to DC power applied to the bus 24 (FIG. 3). During startup, the converter 42 may be configured as a pulse-width-modulation (PWM) inverter, such that the DC power on the bus 24 is converted to variable frequency and variable voltage AC power that is applied to drive the electrical machine and start the mictoturbine. When configured for startup, the converter 42 varies, the frequency and voltage of the AC power at controlled rates so as to accelerate the electrical machine 14 and microturbine 12 to a starting speed. Alternatively, the buck boost chopper circuit 30 may vary the voltage level, and the converter 42 may vary the frequency of the AC power applied to start the microturbine.

The source of the starting power applied to the DC bus 24 may be a battery 18 or other source of DC power, and/or an external AC power source 44. For supply by an AC power source, output contactor (C2) 36 is closed to connect the power circuit topology 38 to the source of AC power, such as a public utility power grid 44. The external AC power generally will typically not provide the variable frequencies and voltages required to start the microturbine. The AC power from the grid can be converted to the variable AC power required to start the microturbine. Accordingly, the external AC power from the grid passes through a filter 32 and is converted to DC power by converter 46 (e.g., PWM inverter), which is configured to operate as a passive AC-to-DC rectifier during the microturbine startup phase (topology of FIG. 2). To configure the converter 46 as an AC-to-DC rectifier, anti-parallel diodes 48 of the inverter circuits in the converter are applied to rectify the AC power from the grid to DC power to charge the bus. Configuring the diodes 48 to operate as a rectifier is effected by disabling the all of the active device gating circuits in the converter 46. A power circuit controller (not shown) for the converter 46 may be used to disable the gating functions.

If no electric power is available from AC power source 44 or if for any reason it is desired to use battery 18 as the source of DC power instead of the power grid, the output contactor C2 36 is opened. The buck-boost chopper 30 converts DC power from the battery 18 to a constant DC voltage (such as to 800 volts (V) or 900V) required at the DC bus 24. The DC-AC converter 42 is then made to operate as a PWM inverter to produce polyphase AC power at gradually increasing voltage and frequency to excite the machine 14. Alternately, the buck-boost chopper 30 can be produce a steadily increasing DC voltage at the DC bus 24 while the DC-AC converter 42 produces polyphase voltages, in a manner similar to that described in aforementioned Sinha, application Ser. No. 09/617,954.

Battery 18 and external AC power source 44 may be used to selectively apply DC power to charge the DC bus during microturbine startup (that is, the DC and AC power sources are used individually or in combination depending on the situation). When the battery and AC power source are used in combination, contactor C2 36 is closed.

The voltage level(s) of the DC bus is selected so as to power the DC-to-AC converter 42. Accordingly, the buck-boost chopper and the converter 46 are controllable so as to produce DC power at the voltage level(s) required for the DC bus and converter 42. A constant voltage level may be applied to the DC bus during startup. This constant voltage level is applied to the DC-to-AC converter 42, which may be configured to operate as a PWM inverter during a startup phase. The converter 42 produces AC power having a gradually increasing frequency and voltage that is applied to the stator windings of the electrical machine 14.

When AC power is applied to the stator windings, the electrical machine is driven as a motor and the rotor of the electrical machine rotates under the influence of the magnetic fields generated by the AC power in the stator windings. The rotor drives the microturbine via shaft 20. The gradually increasing frequency and voltage of the AC power accelerates the rotor of the electrical machine and, in turn, the rotational speed of the microturbine. Once the microturbine has been accelerated to its starting speed, it can sustain combustion and operate under its own power.

Once started and producing power, the microturbine is disengaged from startup power by configuring the DC-to-AC converter 42 as an AC-to-DC rectifier (FIG. 3) to convert the AC power from the electrical machine to DC power applied to charge the DC bus 24. The converter 42 is configured as a rectifier by using the anti-parallel diodes 50 of the converter as an AC-to-DC rectifier. Power from the DC bus is converted back to AC power by the other DC-to-AC converter 46. If the output contactor 36 is opened, it is now closed. The AC power is produced at a frequency and voltage level suitable for the load 16. The output filter 32 removes unwanted voltage components from the AC power before it is applied to the load via closed output contactor 36. In addition, DC voltage from the bus may be applied to charge the battery 18 via the buck boost chopper 30.

Although the invention has been described and illustrated in detail, it is clearly understood that the same is by way of example and illustration only and is not to be taken by way of limitation. The terms of the present invention are to be limited only by the appended claims.

What is claimed is:

1. A method for operating a turbine coupled to an electric machine comprising: using a DC power source and an AC power source to selectively apply DC power to a DC bus, using a bi-directional converter for converting DC power from the DC bus to AC power such that the frequency of the converted AC power gradually increases, applying the AC power to drive the electric machine to start the turbine; after starting the turbine, using the turbine to drive the electric machine, using the bi-directional converter for converting AC power generated by the electric machine to DC power for the DC bus, converting DC power from the DC bus to load-driving AC power, and supplying the load-driving AC power to a load.

2. The method of claim 1 wherein the AC power source comprises a public utility power grid.

3. The method of claim 2 wherein converting DC power from the DC bus to load-driving AC power comprises using a second bi-directional converter, and wherein using a DC power source and an AC power source to selectively apply DC power to a DC bus includes using the second bi-directional converter to convert AC power from the grid to DC power for the DC bus.

4. A method for starting a turbine coupled to an electrical machine which in turn is driven by a power circuit including a buck-boost chopper circuit and a DC bus, wherein the method comprises: charging the DC bus from source of DC voltage and from a source of AC power, converting DC power from the DC bus to AC power using a bidirectional converter, where the frequency of the AC power increases in proportion to the gradually increasing voltage level output from the buck-boost chopper, applying the AC power from the bi-directional converter to drive the electrical machine as a motor and start the turbine; and then, after starting the turbine, using the turbine to drive the electric machine, using the bi-directional converter for converting AC power generated by the electric machine to DC power for the DC bus, converting DC power from the DC bus to load-driving AC power, and supplying the load-driving AC power to a load.

5. A method for starting a turbine as in claim 4 wherein the turbine comprises a microturbine.

6. A power circuit for coupling an external load to a turbine and an electrical machine, wherein the power circuit comprises: a first DC-to-AC converter coupled to the electrical machine, and having a first configuration to convert AC power from the electrical machine to DC power and a second configuration to convert DC power to AC power applied to the electrical machine; a DC bus coupled to the first DC-to-AC converter; a second DC-to-AC converter coupled to the DC bus, and having a first configuration to convert AC power from an external AC power source to DC power applied to the DC bus, and a second configuration to convert DC power from the bus to AC power applied to an external load; a DC power source electrically coupled to the DC bus.

7. A power circuit as in claim 6 wherein the first and second DC-to-AC converters are pulse width modulator (PWM) inverters each including anti-parallel diodes.

8. A power circuit as in claim 6 wherein anti-parallel diodes within the second DC-to-AC converter are configured as AC-to-DC rectifiers in said second configuration.

9. A power circuit as in claim 6 wherein a buck-boost chopper couples the DC power source to the DC bus.

* * * * *